US012695146B2

(12) United States Patent

Templeman et al.

(10) Patent No.: US 12,695,146 B2

(45) Date of Patent: *Jul. 28, 2026

(54) BATTERY WITH INTEGRATED SHOCK AND VIBRATION BARRIER

(71) Applicant: Project-X18, Inc., Overland Park, KS (US)

(72) Inventors: Brock Templeman, Overland Park, KS (US); Jon Templeman, Overland Park, KS (US)

(73) Assignee: PROJECT-X18, INC., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/054,600

(22) Filed: Feb. 14, 2025

(65) Prior Publication Data

US 2026/0051591 A1 Feb. 19, 2026

Related U.S. Application Data

(60) Provisional application No. 63/684,139, filed on Aug. 16, 2024.

(51) Int. Cl.
H01M 50/242 (2021.01)
B60R 16/04 (2006.01)
(Continued)

(52) U.S. Cl.
CPC ........... H01M 50/242 (2021.01); B60R 16/04 (2013.01); H01M 10/488 (2013.01);
(Continued)

(58) Field of Classification Search
CPC ..................................................... B60R 16/04
See application file for complete search history.

(56) References Cited

U.S. PATENT DOCUMENTS

| | | | |
|---|---|---|---|
| 321,856 | A | 7/1885 | Sargent |
| 2,947,373 | A | 8/1960 | Wilson |

(Continued)

FOREIGN PATENT DOCUMENTS

| | | |
|---|---|---|
| CN | 202633410 U | 12/2012 |
| CN | 106997967 A | 8/2017 |

(Continued)

OTHER PUBLICATIONS

Anvar Valeev, et al., "Designing of Compact Low Frequency Vibration Isolator with Quasi-Zero-Stiffness," Journal of Low Frequency Noise, Vibration and Active Control, vol. 34, 459-474, 2015, 15 pages.

(Continued)

*Primary Examiner* — Maria Laios
(74) *Attorney, Agent, or Firm* — HOVEY WILLIAMS LLP

(57) ABSTRACT

An integrated battery and shock and vibration barrier isolates its battery from shocks and vibrations and achieves a natural frequency of less than 10 Hz. The integrated battery and shock and vibration barrier has no fitment problems and doesn't require volume-reducing modifications to the battery. The integrated battery and shock and vibration barrier is equipped with securement features that interact with the existing hold down structures in OEM battery holders and includes prominent features that inform consumers of the unique qualities of the battery.

65 Claims, 8 Drawing Sheets

(51) Int. Cl.

| | |
|---|---|
| *H01M 10/48* | (2006.01) |
| *H01M 50/249* | (2021.01) |
| *H01M 50/262* | (2021.01) |
| *H01M 50/55* | (2021.01) |
| *H01M 50/591* | (2021.01) |

(52) U.S. Cl.
CPC ....... *H01M 50/249* (2021.01); *H01M 50/262* (2021.01); *H01M 50/55* (2021.01); *H01M 50/591* (2021.01); *H01M 2220/20* (2013.01)

(56) References Cited

U.S. PATENT DOCUMENTS

| | | | |
|---|---|---|---|
| 2,980,195 | A | 4/1961 | Herbst |
| 3,053,336 | A | 9/1962 | Zednik, Jr. |
| 3,165,163 | A | 1/1965 | Holka |
| 3,199,624 | A | 8/1965 | Burns |
| 3,651,883 | A | 3/1972 | Aldag |
| 4,367,572 | A | 1/1983 | Zielenski |
| 4,476,200 | A | 10/1984 | Markin et al. |
| 4,508,794 | A | 4/1985 | Wright |
| 5,167,395 | A | 12/1992 | Pearman |
| 5,283,137 | A | 2/1994 | Ching |
| 5,484,667 | A | 1/1996 | Sahli et al. |
| 5,534,364 | A | 7/1996 | Watanabe et al. |
| 5,567,545 | A | 10/1996 | Murakami |
| 6,102,356 | A | 8/2000 | Huntley et al. |
| 6,230,834 | B1 | 5/2001 | Van Hout |
| 6,472,098 | B1 | 10/2002 | Sawada et al. |
| 6,521,371 | B1 | 2/2003 | Lavanture |
| 6,643,122 | B1 | 11/2003 | Fontana et al. |
| 8,051,934 | B2 | 11/2011 | Kiya et al. |
| 8,110,300 | B2 | 2/2012 | Niedzwiecki |
| 8,603,666 | B2 | 12/2013 | Nagamine et al. |
| 8,973,883 | B2 | 3/2015 | Meier et al. |
| 9,276,243 | B2 | 3/2016 | Templeman et al. |
| 9,543,558 | B2 | 1/2017 | Templeman et al. |
| 9,899,648 | B2 | 2/2018 | Templeman et al. |
| 9,954,206 | B2 | 4/2018 | Templeman et al. |
| 10,128,475 | B2 | 11/2018 | Templeman et al. |
| 11,171,379 | B2 | 11/2021 | Templeman et al. |
| 2003/0068545 | A1 | 4/2003 | Wu |
| 2003/0224246 | A1* | 12/2003 | Watanabe ........... H01M 50/258 |
| | | | 429/211 |
| 2005/0173170 | A1 | 8/2005 | Miyajima et al. |
| 2007/0026304 | A1 | 2/2007 | Jeon et al. |
| 2009/0068551 | A1 | 3/2009 | Bernard et al. |
| 2009/0239136 | A1 | 9/2009 | Nagamine et al. |
| 2010/0124693 | A1 | 5/2010 | Kosugi et al. |
| 2010/0230449 | A1 | 9/2010 | Quinn |
| 2011/0068035 | A1 | 3/2011 | Egan et al. |
| 2012/0018238 | A1 | 1/2012 | Mizoguchi et al. |
| 2012/0025045 | A1 | 2/2012 | Meier et al. |
| 2012/0064386 | A1 | 3/2012 | Oguri et al. |
| 2012/0244397 | A1 | 9/2012 | Tenhouten et al. |
| 2012/0251872 | A1 | 10/2012 | Kim |
| 2012/0256582 | A1 | 10/2012 | Kim et al. |
| 2013/0122339 | A1 | 5/2013 | Chae et al. |
| 2013/0156533 | A1 | 6/2013 | Yu et al. |
| 2013/0189563 | A1 | 7/2013 | Chang et al. |
| 2013/0192914 | A1 | 8/2013 | Nakamori |
| 2013/0252060 | A1 | 9/2013 | Bolden et al. |
| 2014/0065455 | A1 | 3/2014 | Chuang et al. |
| 2014/0158443 | A1 | 6/2014 | Lee |
| 2014/0356661 | A1 | 12/2014 | Yang |
| 2014/0356678 | A1 | 12/2014 | Templeman et al. |
| 2015/0044538 | A1 | 2/2015 | Katayama et al. |
| 2015/0060170 | A1* | 3/2015 | Templeman ........ H01M 50/267 |
| | | | 180/68.5 |
| 2015/0188104 | A1* | 7/2015 | Templeman .......... H01M 50/20 |
| | | | 429/100 |
| 2016/0164056 | A1 | 6/2016 | Templeman et al. |
| 2017/0054120 | A1 | 2/2017 | Templeman et al. |
| 2018/0145289 | A1 | 5/2018 | Yu et al. |
| 2019/0044117 | A1* | 2/2019 | Templeman ........ H01M 50/262 |
| 2019/0379018 | A1 | 12/2019 | Varatharajah et al. |
| 2021/0291636 | A1 | 9/2021 | Bohmer et al. |
| 2025/0260115 | A1 | 8/2025 | Hatta |

FOREIGN PATENT DOCUMENTS

| | | |
|---|---|---|
| CN | 109058378 A | 12/2018 |
| CN | 211017224 U | 7/2020 |
| CN | 111942505 A | 11/2020 |
| CN | 217134622 U | 8/2022 |
| CN | 113446298 B | 1/2023 |
| DE | 19828600 C1 | 1/2000 |
| EP | 2290728 A1 | 3/2011 |
| JP | 1994-107090 A2 | 4/1994 |
| JP | 1995-223499 A2 | 8/1995 |
| JP | 1999-297290 A2 | 10/1999 |
| JP | 2000-509468 A2 | 7/2000 |
| JP | 2003-059483 A2 | 2/2003 |
| JP | 2003-063328 A2 | 3/2003 |
| JP | 2018-108789 A2 | 7/2018 |
| JP | 2019-212561 A2 | 12/2019 |
| JP | 2022-142199 A2 | 9/2022 |
| KR | 2019930016308 | 7/1993 |
| KR | 2019930016332 | 7/1993 |
| KR | 1712283 B1 | 3/2017 |
| RU | 0018212 U1 | 5/2001 |
| RU | 2557865 C1 | 7/2015 |
| WO | WO1994026559 A1 | 11/1994 |
| WO | WO2004088771 A2 | 10/2004 |

OTHER PUBLICATIONS

Khursheed Sabeel et al., "Advancements in Vibration Testing: Effects on Thermal Performance and Degradation of Modern Batteries," Batteries, 11, 82. 1-41, 2025, 41 pages.

International Search Report and Written Opinion in related PCT Application PCT/US2025/039836 mailed Nov. 26, 2025, 13 pages.

International Search Report and Written Opinion in related PCT Application PCT/US2025/039838 mailed Dec. 10, 2025, 14 pages.

International Search Report and Written Opinion in related PCT Application PCT/US2025/039839 mailed Dec. 2, 2025, 14 pages.

International Search Report and Written Opinion in related PCT Application PCT/US2025/047334 mailed Jan. 29, 2026, 11 pages.

International Search Report and Written Opinion in related PCT Application PCT/US2025/047336 mailed Jan. 26, 2026, 10 pages.

* cited by examiner

BATTERY WITH INTEGRATED SHOCK AND VIBRATION BARRIER

CROSS-REFERENCE TO RELATED APPLICATIONS

The current patent application is a non-provisional utility patent application which claims priority benefit, with regard to all common subject matter, of earlier-filed U.S. Provisional Application Ser. No. 63/684,139; titled "BATTERY WITH INTEGRATED SHOCK AND VIBRATION BARRIER"; and filed Aug. 16, 2024. The Provisional Application is hereby incorporated by reference, in its entirety, into the current patent application.

BACKGROUND OF THE INVENTION

Cars, boats, motorcycles, and other vehicles typically include one or more batteries for storing and providing electrical power to the vehicles. These batteries can fail or prematurely degrade in performance due to excessive vibrations and/or shocks generated or transmitted by the vehicles and/or the vehicles' operating environments. This is especially true for batteries used in trucks, off-road vehicles, boats, personal watercraft, all-terrain vehicles, and other vehicles that operate in rough water or on uneven terrain. Vehicle batteries are expensive, difficult to replace, and difficult to safely dispose and recycle. Thus, avoiding premature battery failure and replacement is highly desired.

Impact shocks, often caused by potholes for land-based vehicles and rough waves for boats, and vibrations, often caused by vehicle engines and other mechanical components, are two leading causes of premature battery failure. To date, the battery industry's attempts to address these problems have been to make the internal components of batteries more robust to endure or withstand the impact shocks and vibrations. This increases costs to manufacture the batteries and components, adds weight to the batteries, and does nothing to dampen the impact shocks and vibrations. As impact shocks and vibrations become more severe, the construction of the batteries and components must likewise become more robust and durable to withstand the more extreme environments-continuing to add cost and weight while still resulting in impact shock and vibration-related battery and component failures. In other words, the battery industry has focused on bulking up the components on the insides of batteries instead of focusing on dampening or eliminating the external impact shocks and vibrations from being transmitted into the batteries.

Most vehicles are equipped with battery boxes, battery trays or other original equipment battery hold down devices "OEM battery holders" to secure their batteries. Such OEM battery holders often don't absorb vibrations and shocks but instead transmit them directly into their batteries. Shock and/or vibration absorbing pads may be placed in these OEM battery holders and under their batteries, but such pads do not secure the batteries to their vehicles. The batteries therefore must be strapped onto or otherwise secured to the vehicles while they are on the pads, eliminating much of the benefits of the pads because the straps compress the pads and vibrations and shocks travel through the straps into the batteries.

Supplemental battery cases and other aftermarket battery hold-down and protection devices have also been developed to protect batteries, but they suffer from similar limitations. For example, many aftermarket battery hold-down and protection devices don't fit properly in their intended vehicles.

Vehicle and equipment batteries are dimensionally constrained by several regulatory groups such as BCI (Battery Council International), EN (European Norm), DIN (German Industrial Standard), JIS (Japanese Industrial Standard), etc. that specify particular battery group sizes. These designated battery group sizes are then used by vehicle manufacturers and others to design OEM battery holders to guarantee batteries will fit properly into their vehicles. Aftermarket battery hold-down and protection devices add additional length, width, and/or height which exceeds the battery group size requirements, creating fitment interference with the OEM battery holders. Thus, aftermarket battery hold-down and protection devices often require vehicle modifications or battery relocation for installation, which consumers may not be capable of or comfortable doing and which may void vehicle warranties and lower vehicle resale values. These specifications therefore make it difficult to incorporate shock and vibration isolation elements found in some hold-down boxes, cases, trays, and aftermarket battery protection devices.

Impact shocks and vibrations are two distinctly different problems that adversely affect the life of batteries. Impact shocks are typically infrequent and often higher amplitude than consistent vibrations created by operating environments (i.e. consistent over-the-road vibrations or consistent engine idling vibrations versus sudden, high-amplitude impact shocks caused by hitting potholes). Because impact shocks and vibrations have different characteristics, they require a solution that is focused on solving each issue individually.

Vibration isolation attempts to prevent transmission of vibrations from one component of a system to other parts of the same system. There are two types of vibration isolation systems that are used to dampen vibration: passive or active. Passive isolation systems use the natural properties of a spring or elastomeric dampener material to reduce vibrations and are relatively inexpensive and are excellent at mitigating high-frequency vibrations. However, their natural resonance is problematic in applications where low-frequency vibrations are common. Active isolation systems consist of feedback and feed-forward control systems with integrated sensors and actuators. These systems isolate the most sensitive equipment from extremely low-frequency vibrations that passive isolation systems amplify at resonant frequencies, but they are too complicated and costly for many applications.

The Society of Automotive Engineers (SAE) requires batteries to be subjected to vibration testing in the low-frequency vibration range of 30-36 Hz under their SAE J3060 Test Specification. Additionally, a more rigorous test in the range of 10-55 Hz is utilized for Absorbent Glass Mat (AGM) batteries.

Because of their low cost and manufacturing simplicity, passive isolation systems are often more practical than active isolation systems. However, passive isolation systems typically amplify vibration at resonant frequencies in these low 10-55 Hz and 30-36 Hz ranges. Therefore, it would be desirable to create a cost-effective, easy-to-manufacture passive isolation system that reduces vibration transmissibility in these low 10-55 Hz and 30-36 Hz ranges without causing amplification. In order to effectively reduce the transmissibility of vibration in the 10-55 Hz and 30-36 Hz ranges, the isolation system needs to have a natural frequency of less than 10 Hz. Creating a passive isolation system with a natural frequency of less than 10 Hz is extremely difficult.

Creating cost-effective, easy-to-manufacture passive isolation systems is important to maintain a competitive retail price point while providing better-performing battery protection. Furthermore, it is desirable to create passive isolation systems that feature manufacturing processes the same or similar to the current manufacturing processes battery manufacturing facilities utilize to easily integrate into the production process with minimal disruption to the pre-established battery manufacturing methods (i.e. injection-molding, ultrasonic welding, and the utilization of manufacturing-assisted robotics). Lastly, it is desirable to utilize common, readily-available, materials to create passive isolation systems so that production costs are reduced and adequate supply is available for the large volumes associated with global battery manufacturing.

Batteries are also subjected to harsh operating environments of extremely high and extremely low temperature ranges and a wide variety of under-the-hood chemicals such as gasoline, oil, power steering fluid, transmission fluid, brake fluid, windshield wiper fluid, water, etc. Batteries are also often subjected to multi-directional operating forces that put varying levels of stress and strain on the structure of the batteries. Batteries must be designed and manufactured to be robust, durable, and capable of withstanding these harsh environmental and multi-directional operating forces with low/no risk of structural failure as confirmed by passing FEA and MODAL Analysis Simulations/Testing. Developing a passive isolation system that features materials and the proper structural design capable of withstanding these environments is necessary for durability and long-term performance.

At the end of a battery's lifespan, it is typically recycled, and its elements are separated and returned to usable, recycled forms-making the end-product sustainable. Therefore, it is important for all materials in a battery protection system to be 100% recyclable/re-purposable.

There are a variety of types of batteries such as: lithium, AGM (absorbent glass mat), flooded lead-acid, A/B, solid-state, etc. Each type of battery includes a wide variety of sizes and shapes for different applications—from large submarine batteries down to the smallest lawn and garden batteries. All battery types, sizes, and shapes can be damaged and negatively affected by impact shock and vibration. Therefore, creating an isolation system that is applicable and beneficial to all different types, sizes, and shapes of batteries is essential.

SUMMARY OF THE INVENTION

Embodiments of the present invention solve the above-described problems and related problems by providing a battery with an integrated shock and vibration barrier that more effectively isolates the battery from shocks and vibrations and that achieves a natural frequency of less than 10 Hz. The shock and vibration barrier creates no fitment problems and doesn't require volume-reducing modifications to the battery. The shock and vibration barrier is also equipped with securement features that interact with existing hold down structures in OEM battery holders and includes prominent features that inform consumers of the unique shock and vibration mitigating qualities of the barrier.

The battery may be a lithium battery, an absorbent glass mat battery, a flooded lead-acid battery, an A/B type battery, a solid-state battery, or any other battery type designed for use in vehicles and other devices subject to shocks and vibrations. The battery may be designed to start an internal combustion engine or may power the electric motors of an electrically powered vehicle. In accordance with an important aspect of the invention, the lower portion of the battery housing is stepped-in to define a lower circumscribing channel with a lowermost retaining flange, the purpose of which is described below.

The shock and vibration barrier is integrally attached to the battery and protects it from shocks and vibrations. In one embodiment, the shock and vibration barrier comprises a shock and vibration absorbing pad; a base plate; a pair of clamps; and a top plate.

The shock and vibration absorbing pad attaches to the battery and provides much of the shock and vibration isolation qualities of the invention. The base plate fits within an OEM battery holder or battery compartment of a vehicle and supports the battery and pad. The clamps secure the pad to the base plate, and the top plate covers the terminals of the battery and provides a surface on which to provide battery branding and/or instructions. As discussed in more detail below, the clamps and base plate may also serve as hold-down features for the battery, and the top plate may incorporate integrated anti-theft features.

An embodiment of the shock and vibration absorbing pad is formed of compressible material such as polyurethane or rubber and comprises a substantially planar bottom surface; an upper surface opposite the bottom surface; and an upstanding lip surrounding a perimeter of the upper surface. In accordance with an important aspect of the invention, the upstanding lip forms an uninterrupted barrier that spaces the battery from the base plate and the clamps, so the battery does not directly touch the base plate or the clamps. This isolates the battery from the base plate and the clamps and the vehicle surface on which the battery holder rests. Because the battery is isolated from the base plate and the clamps and hence the vehicle by the pad, no direct mechanical pathway exists between the vehicle and the battery, and shocks or vibrations that are transferred from the vehicle to the base plate and/or clamps are at least partially mitigated by the shock and vibration absorbing pad.

In accordance with another important aspect of the present invention, the pad also comprises a plurality of vibration isolators (also referred to herein as "Duodes") extending upwardly from the pad's upper surface. The vibration isolators exhibit quasi-zero stiffness qualities as described in more detail below. Also as explained in more detail below, the vibration isolators, along with the other components of the shock and vibration barrier, create a passive isolation system with a natural frequency of less than 10 Hz. The quantity, size, and shape of the Duodes can be selected or "tuned" to achieve a desired isolation system natural frequency for different sizes, shapes, and weights of various batteries.

The shock and vibration absorbing pad also comprises a plurality of shock-mitigating elements also extending upwardly from the pad's upper surface. The shock-mitigating elements assist the Duodes in isolating unusually severe shocks such as when a vehicle hits a pothole or other road obstruction. The quantity, size, and shape of the shock-mitigating elements can be selected or "tuned" to achieve different amounts of shock protection for different sizes, shapes, and weights of batteries.

In accordance with another important aspect of the invention, the shock and vibration absorbing pad's upstanding lip remains visible when the shock and vibration barrier assembly is affixed to the battery to create a prominent ribbon or sidewall around the perimeter of the battery so that end consumers are able to easily identify the integrated shock and vibration barrier of the present invention.

In accordance with yet another important aspect of the invention, the shock and vibration absorbing pad fits mostly within the stepped-in lower circumscribing channel of the battery housing, so it adds almost no length, width, or height to the battery and therefore creates no fitment issues and is in compliance with all regulatory group fitment specifications.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the present invention are described in detail below with reference to the attached drawing figures, wherein.

Figure 1:
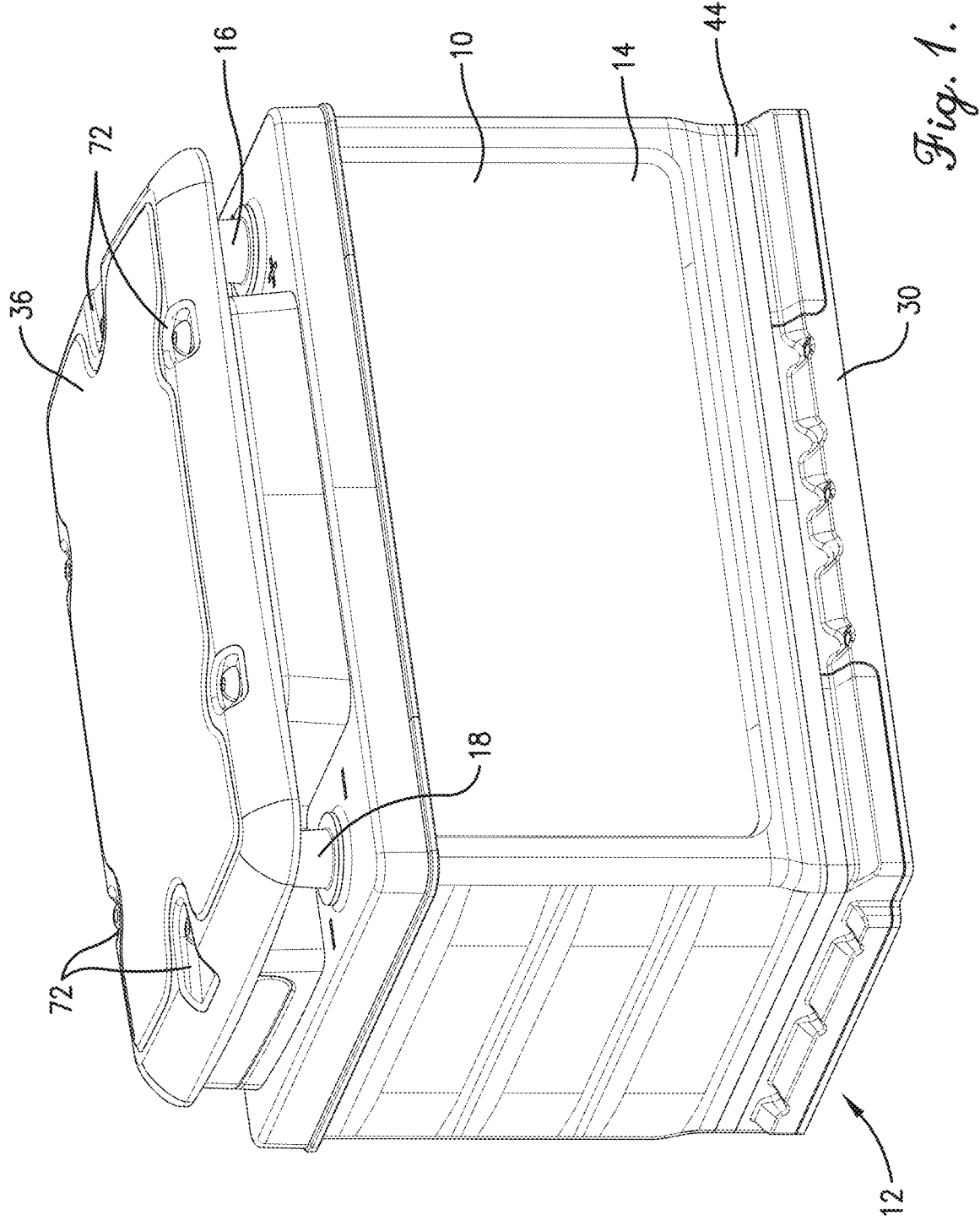
FIG. 1 is a perspective view of a battery and integrated shock and vibration barrier constructed in accordance with embodiments of the present invention and shown in their fully assembled state.

The drawing figures do not limit the present invention to the specific embodiments disclosed and described herein. The drawings are not necessarily to scale, emphasis instead being placed upon clearly illustrating the principles of the invention.

DESCRIPTION OF EMBODIMENTS OF INVENTION

A battery 10 and integrated shock and vibration barrier 12 constructed in accordance with embodiments of the present invention will now be described in more detail with reference to the attached drawing figures. As described in more detail below, the shock and vibration barrier 12 more effectively isolates the battery 10 from shocks and vibrations and achieves a natural frequency of less than 10 Hz. The shock and vibration barrier 12 also creates no fitment problems and doesn't require volume-reducing modifications to the battery 10. The shock and vibration barrier is also equipped with securement features that interact with the existing hold down structures in OEM battery holders and includes prominent features that inform consumers of the unique qualities of the invention.

Specific embodiments of the battery 10 and shock and vibration barrier 12 will now be described with reference to the attached drawings figures. The present invention is not limited to these specific embodiments but also encompasses other embodiments and variations.

The battery 10 may be a lithium battery, an absorbent glass mat battery, a flooded lead-acid battery, an A/B type battery, a solid-state battery, or any other battery type designed for use in vehicles and other devices subject to shocks and vibrations. The battery 10 may be designed to start an internal combustion engine or may power the electric motors of an electrically powered vehicle. The battery includes a partially hollow shell 14 that encloses a number of conventional battery plates and/or other components and external positive and negative terminals 16, 18 extending through its cover and electrically connected to the internal battery components. The battery shell may be formed of any corrosion-resistant materials and conforms to BCISM Battery Group Size requirements and/or other battery group size specifications.

Figure 2:
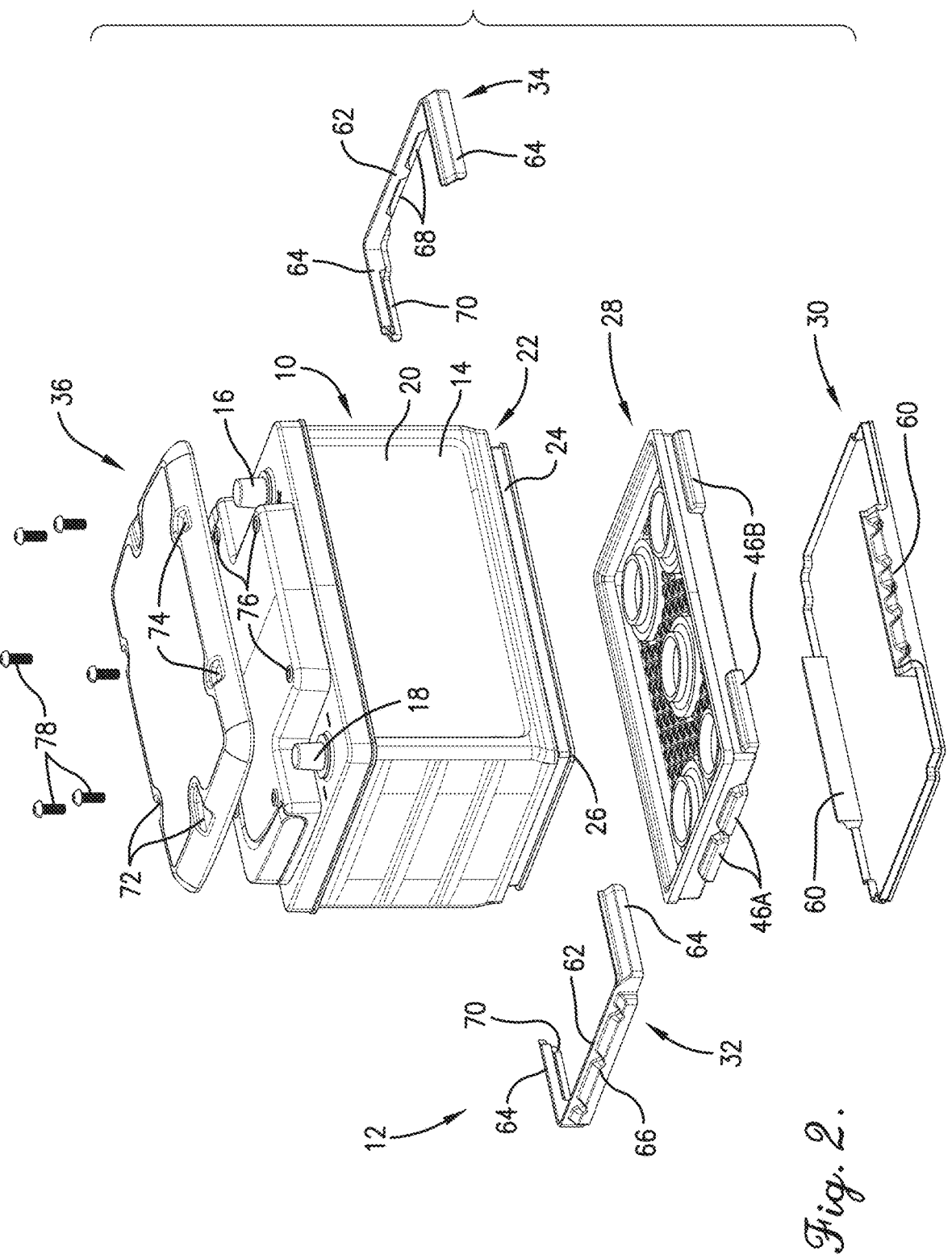
FIG. 2 is an exploded view of the battery and shock and vibration barrier.

To accommodate the shock and vibration barrier, the lower walls of the battery shell 14 are stepped-in to define an upper section 20 and a slightly smaller lower section 22 as best shown in FIG. 2. The upper section 20 is generally the same length and width as a standard battery, but the lower section 22 has a decreased length and width so as to form a circumscribing channel 24 beneath the upper section, the purpose of which is described below. The channel is bounded by a raised retaining flange 26 on the lowermost part of the battery shell. In one embodiment, the channel 24 is approximately 1/8-3/4" high and is recessed 1/8-3/4" from the upper part of the battery housing. In one embodiment, the channel decreases the volumetric capacity of the battery by less than 25%. In other embodiments, the channel decreases the volumetric capacity of the battery by less than 10%. In still other embodiments, the channel decreases the volumetric capacity of the battery by less than 5%.

Components of the shock and vibration barrier 12 are attached within the battery channel 24 to provide the shock and vibration protection qualities described herein. As best shown in FIG. 2, an embodiment of the shock and vibration barrier 12 assembly comprises a shock and vibration absorbing pad 28; a base plate 30; a pair of clamps 32, 34; and a top plate 36.

As described in more detail below, the shock and vibration absorbing pad 28 fits over the bottom of the battery 10; the base plate 30 fits within an OEM battery holder or battery compartment of a vehicle so as to support the pad 18 and battery 10 in the OEM battery holder; the clamps 32, 34 secure the pad 28 to the base plate 30; and the top plate 36 covers the terminals 16, 18 of the battery, provides a surface on which to provide battery branding and/or instructions, and has integrated anti-theft features.

Figure 3:
FIG. 3 is a top perspective view of the shock and vibration absorbing pad of the shock and vibration barrier.

Embodiments of the shock and vibration absorbing pad 28 will now be described in more detail primarily with reference to FIGS. 3-5. The shock and vibration absorbing pad 28 is formed of compressible materials such as polyurethane, thermoplastic polyurethane (TPU), or rubber and in some embodiments, the materials forming the pad exhibit a durometer of greater than 20 Shore A Hardness. The pad may be formed via injection molding, casting, machining, or stamping. The pad and all its components are preferably integrally formed in one-piece, but some of the components may be separately formed.

An embodiment of the pad 28 comprises a substantially planar bottom surface 38; an upper surface 40 opposite the bottom surface; and an upstanding lip 42 surrounding a perimeter of the upper surface. As best shown in FIG. 4, the top of the pad's lip 42 curves outwardly to form an overhang 44, the purpose of which is described below. The pad 28 also includes several protrusions 46A, 46B below the lip, the purpose of which are described below.

In accordance with another important aspect of the present invention, the pad 28 also comprises a plurality of vibration isolators 48 (also referred to herein as "Duodes" herein) extending upwardly from the pad's upper surface. The vibration isolators 48 exhibit quasi-zero stiffness qualities, and along with the other components of the shock and vibration barrier, create a passive isolation system with a natural frequency of less than 10 Hz. The quantity, size, and shape of the Duodes can be selected or "tuned" to achieve a desired isolation system natural frequency for different sizes, shapes, and weights of various batteries.

The pad 28 also comprises a plurality of shock-mitigating elements 50 extending upwardly from the pad's upper surface. The shock-mitigating elements 50 assist the Duodes 48 in isolating severe shocks such as when a vehicle hits a pothole or other road obstruction. The quantity, size, and shape of the shock-mitigating elements can be selected or "tuned" to achieve different amounts of shock protection for different sizes, shapes, and weights of batteries. Specific embodiments of the Duodes 48 and shock-mitigating elements 50 are described in more detail below.

Embodiments of the base plate 30, which support the pad 28 and battery 10 in a vehicle, will now be described primarily with reference to FIGS. 2 & 5. The base plate 30 is formed of rigid materials such as plastic or metal and comprises a substantially planar bottom surface 52; a planar upper surface 54 opposite the bottom surface; an upstanding lip 56 surrounding the perimeter of the upper surface; a horizontally-projecting ledge 58 extending outwardly from the bottom of the lip and hold-down structure 60 extending upwardly from two sides of the upper surface for engaging corresponding hold-down structure in the OEM battery holder.

Embodiments of the clamps 32, 34, which secure the pad 28 to the base plate 30, will now be described primarily with reference to FIG. 2. The clamps are preferably formed of rigid materials such as plastic and each comprises an end wall 62 and two transversely extending legs 64. Hold-down structure 66 is formed on each end wall for engaging corresponding hold-down structure in the OEM battery holder. The inside surface of each end wall has a pair of recesses 68 that fit over the protrusions 46A on the pad 28. Similarly, the inside surface of each leg has a recess 70 that fits over one of the protrusions 46Bon the pad.

Embodiments of the top plate 36 will now be described primarily with reference to FIGS. 1 & 2. The top plate 36, which is preferably formed of plastic or other rigid materials, covers the top of the battery and provides a surface on which to provide battery branding and/or instructions. An embodiment of the top plate includes a number of recessed areas 72, the purpose of which is described below. The top plate also covers the battery cable connectors attached to the battery terminals to prevent the battery cables from being removed from the battery to make it even more difficult to remove the battery.

In accordance with an important aspect of the invention, the top plate and battery also comprise integrated anti-theft fastening elements that make it difficult to remove the battery from the vehicle without special tools. In one embodiment, the anti-theft fastening elements comprise internally-threaded, female type fastening elements 74 in the top plate and aligned internally-threaded, female type fastening elements 76 in the battery. The anti-theft fastening elements also compromise externally-threaded, male type fastening elements 78 or similar locking hardware that can be threaded into the fastening elements 74, 76 in the top plate and battery to prevent the top plate from being easily removed from the battery and to prevent the battery from being removed from the vehicle. The externally-threaded male type fastening elements may have heads with unique socket patterns that require a key with a matching head pattern or other device for removal.

Figure 6:
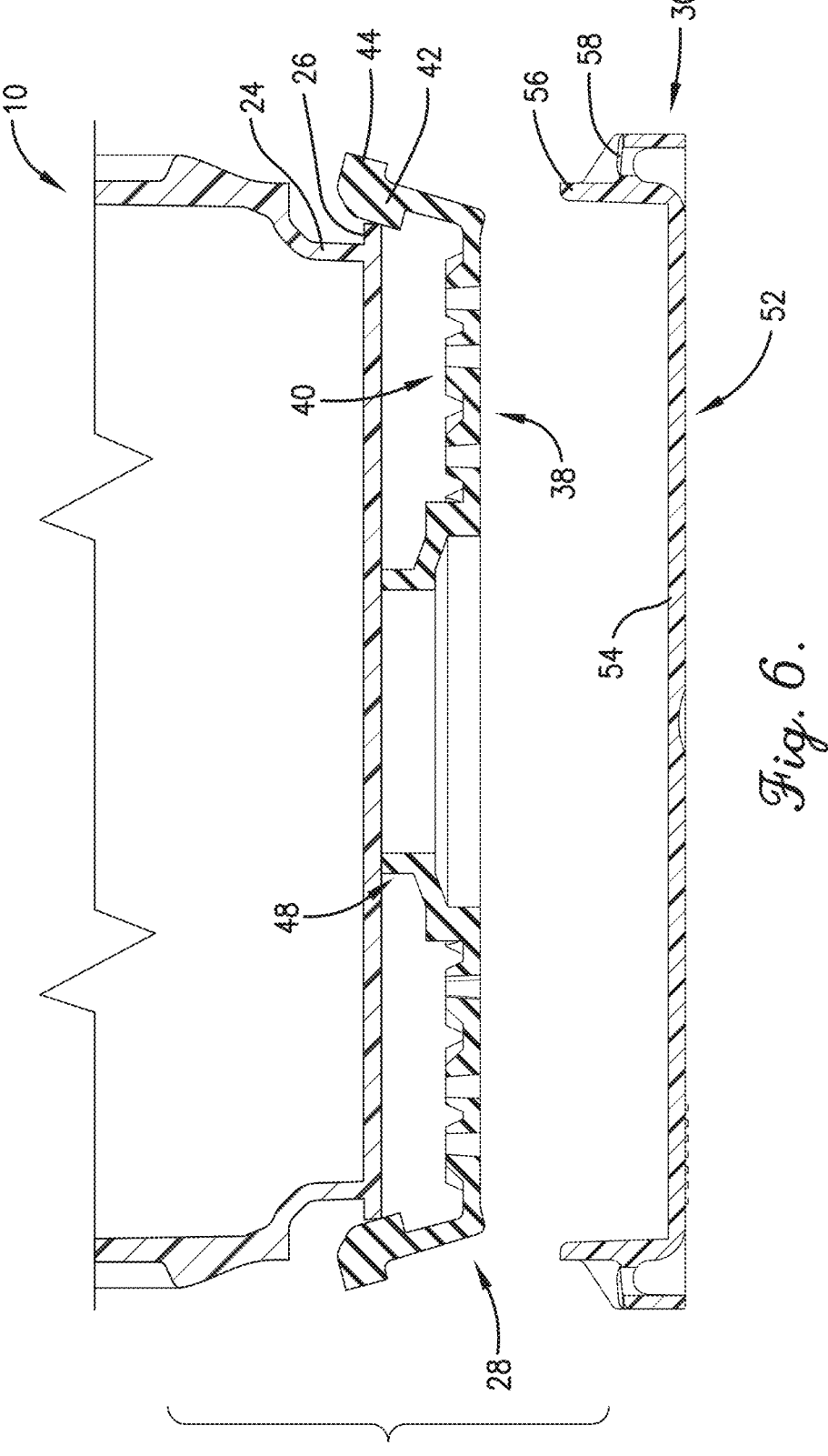
FIG. 6 is a fragmentary sectional view of the shock and vibration absorbing pad, the base plate, and the battery as the pad is being placed on the battery.
Figures 7, 8:
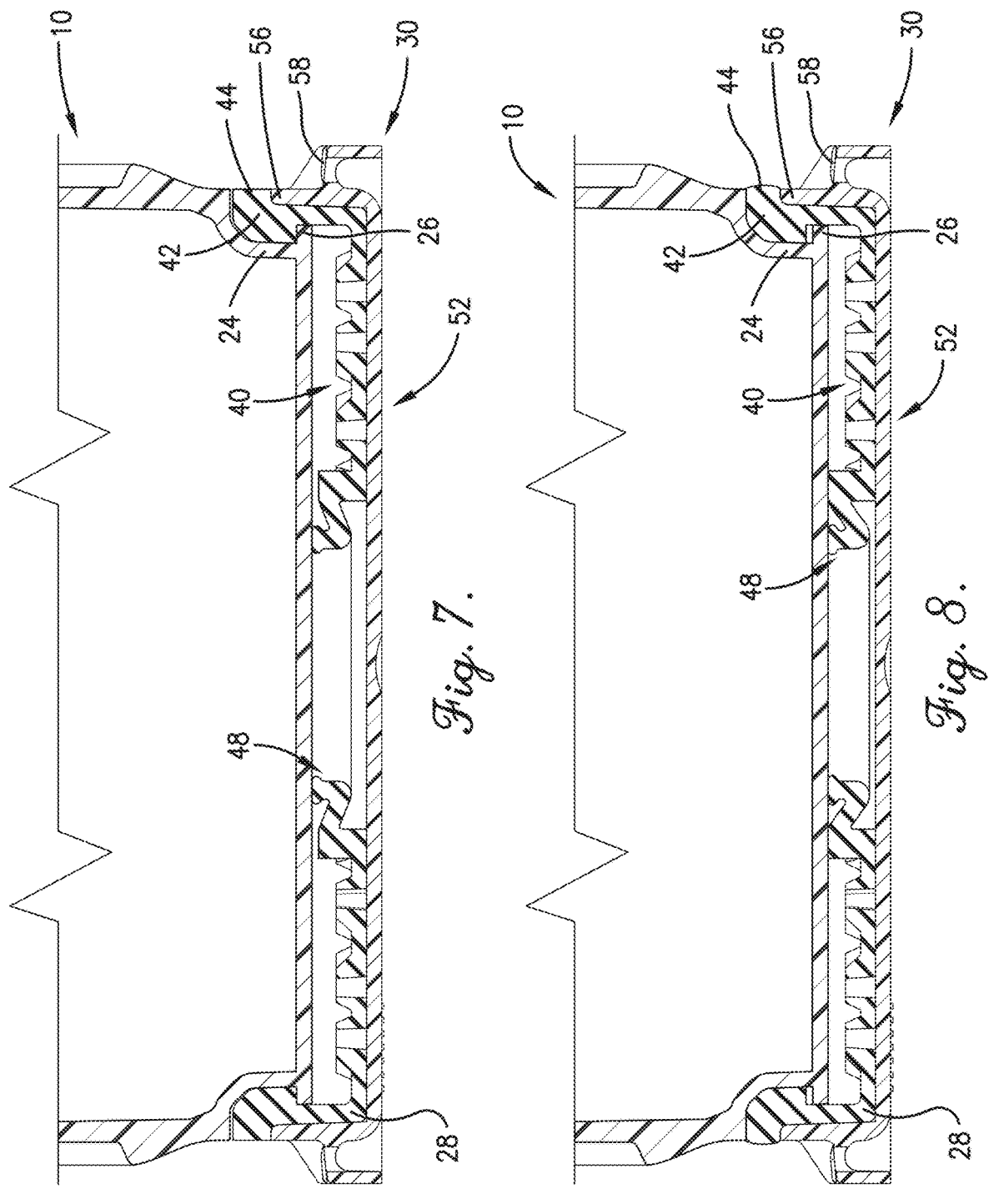
FIG. 7 is a fragmentary sectional view of the shock and vibration absorbing pad, the base plate, and the battery after the pad has been placed on the battery and the pad and battery are on the base plate and the vehicle in which the battery is installed is in a static state.
FIG. 8 is a fragmentary sectional view of the pad, the base plate, and the battery when the vehicle in which the battery is installed is transmitting vibrations and/or shocks to the shock and vibration barrier.

Assembly of the shock and vibration barrier assembly 12 to the battery 10 will now be described with reference to FIGS. 5-7. The pad 28 is first attached to the bottom of the battery 10 such that the lip 42 of the pad fits within the channel 24 of the battery 10 as shown in FIGS. 6 & 7. The battery thus sits atop the pad 28 with its lowermost surface supported on at least some of the Duodes 48. The battery 10 and the attached pad 28 are then placed in the base plate 30 such the lower surface of the pad fits within the lip 56 of the base plate and the protrusions 46B nest on opposite sides of the hold-down structure 60.

The clamps 32, 34 are then slid sideways between the base plate 30 and the pad 28 such that they fit between the raised lip 56 of the base plate and the lip 42 of the pad and cover the projections 46A on the pad. The clamps are then glued, radio-frequency welded, or otherwise adhered to the base plate.

The battery 10 and attached shock and vibration barrier 12 are then placed in a vehicle. In some embodiments, the integrated assembly is placed in an OEM battery holder, and hold-down clamps or other structures in the OEM battery holder are then secured to the hold-down structures 60, 66 to secure the battery and shock and vibration barrier to the vehicle. The vehicle's battery cables are then attached to terminals 16, 18 of the battery.

Finally, the top plate 36 is attached to the top of the battery with the anti-theft fastening elements. The top plate locks the battery cables onto the terminals 16, 18 to prevent someone from attempting to steal the battery. While in some embodiments the top plate 36 must be removed to attach the battery cables to the vehicle, the battery and shock and vibration barrier may be fully assembled with the top plate attached when presented for sale to consumers and installers. An installer may then remove the top plate before the battery and shock and vibration barrier are installed in a vehicle.

When the shock and vibration barrier 12 is secured to the battery 10, the overhang 44 of the lip 42 forms an uninterrupted barrier that spaces the battery 10 from the base plate 30 and the clamps 32, 34 so the battery does not directly touch the base plate or clamps. This isolates the battery 10 from the base plate and the clamps and the vehicle surface on which the battery holder rests. Because the battery is isolated from the base plate and the clamps and hence the vehicle by the shock and vibration absorbing pad, no direct mechanical pathway exists between the vehicle and the battery. Any shocks or vibrations that are transferred from the vehicle to the base plate and/or clamps are at least partially mitigated by the pad.

Importantly, when the battery 10 and shock and vibration barrier 12 are attached as described above, the overhang 44 on the upstanding lip 42 remains visible and creates a prominent ribbon or sidewall around the perimeter of the battery so that consumers are able to visibly identify the integrated shock and vibration features of the assembly. Most features and benefits of batteries are found in the technology on the insides of the batteries-unseen and inaccessible to consumers, making it difficult for consumers to distinguish batteries from one another. Designing an integrated solution that is visible from the outside of the battery allows consumers to easily see, understand, and distinguish the benefits of the present invention.

Also importantly, because the pad 28 attaches within the stepped in channel 24 of the battery, it adds almost no length, width, or height to the battery and therefore creates not fitment issues and is in compliance with all regulatory group fitment specifications.

Specific embodiments of the Duodes 48 and shock-mitigating elements 50 of the pad 28 will now be described in more detail with reference to FIGS. 4-8. The Duodes 48 provide vibration and shock attenuation and help the battery and integrated shock and vibration barrier assembly achieve a system natural frequency of less than 10 Hz. In some embodiments, the Duodes attenuate more than 30% of vibrations in the 10-55 Hz range. In other embodiments, the Duodes attenuate more than 30% of vibrations in the 30-36 Hz range. The Duodes exhibit quasi-zero stiffness as described in "Designing of Compact Low Frequency Vibration Isolator with Quasi-Zero Stiffness" by Anvar Valeev, Alexey Zotov, and Shamil Kharisov in the *Journal of Low Frequency Noise, Vibration and Active Control* on Jul. 19, 2015. Quasi-zero stiffness means an elastic system with a flat area on its static force characteristic, i.e. an area with near zero stiffness. A system or device with quasi-zero stiffness obtains simultaneous high static load and low dynamic stiffness. Applicant has discovered that this quality makes quasi-zero stiffness isolators ideal for vibration and shock attenuation for batteries.

But constructing a vibration and shock isolator with Quasi-Zero stiffness is difficult, and constructing one that works well in the footprint of a battery is even more challenging. Applicant believes the Duodes illustrated and described herein successfully achieve the desired qualities.

Figure 4:
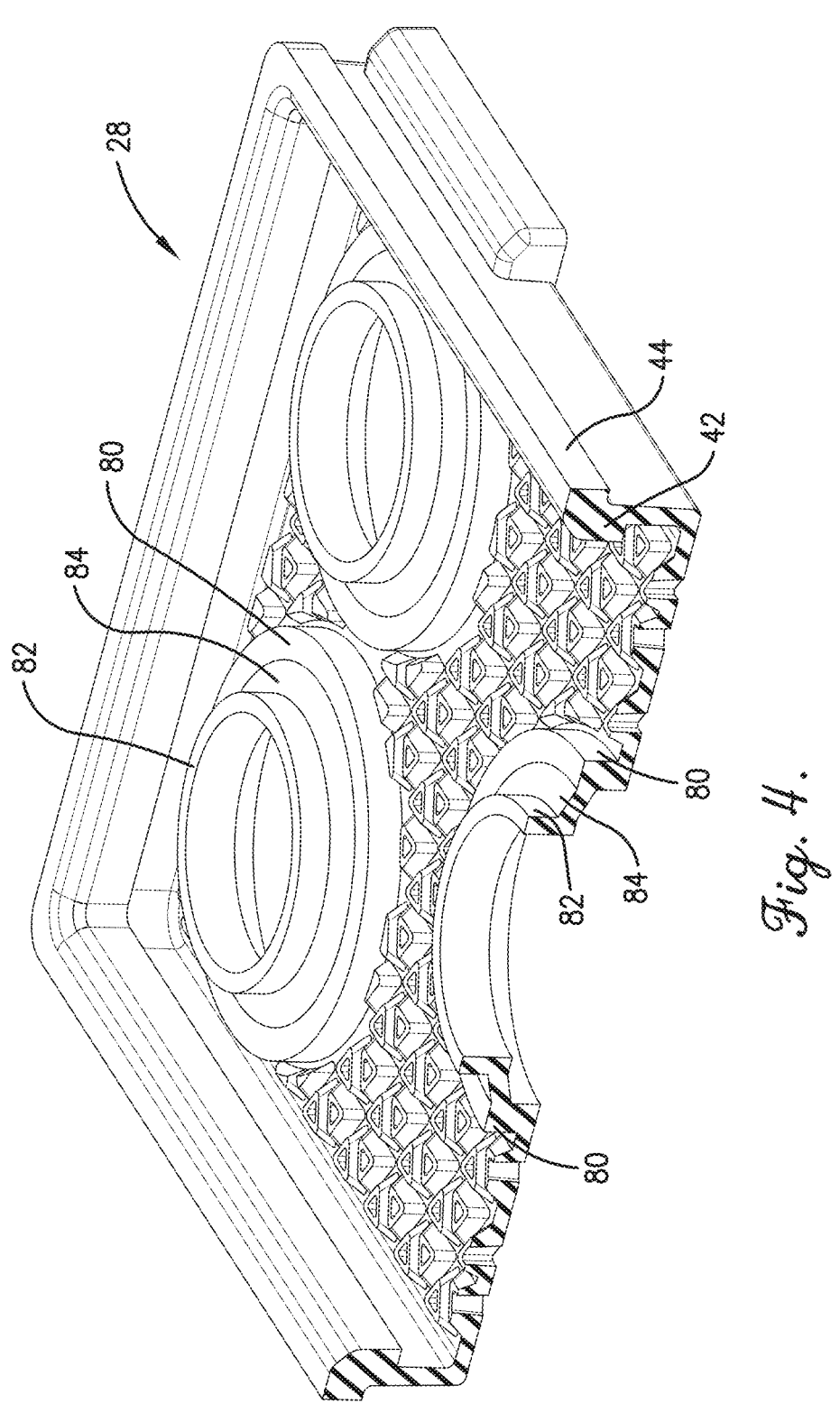
FIG. 4 is a fragmentary sectional view of the shock and vibration absorbing pad.
Figure 5:
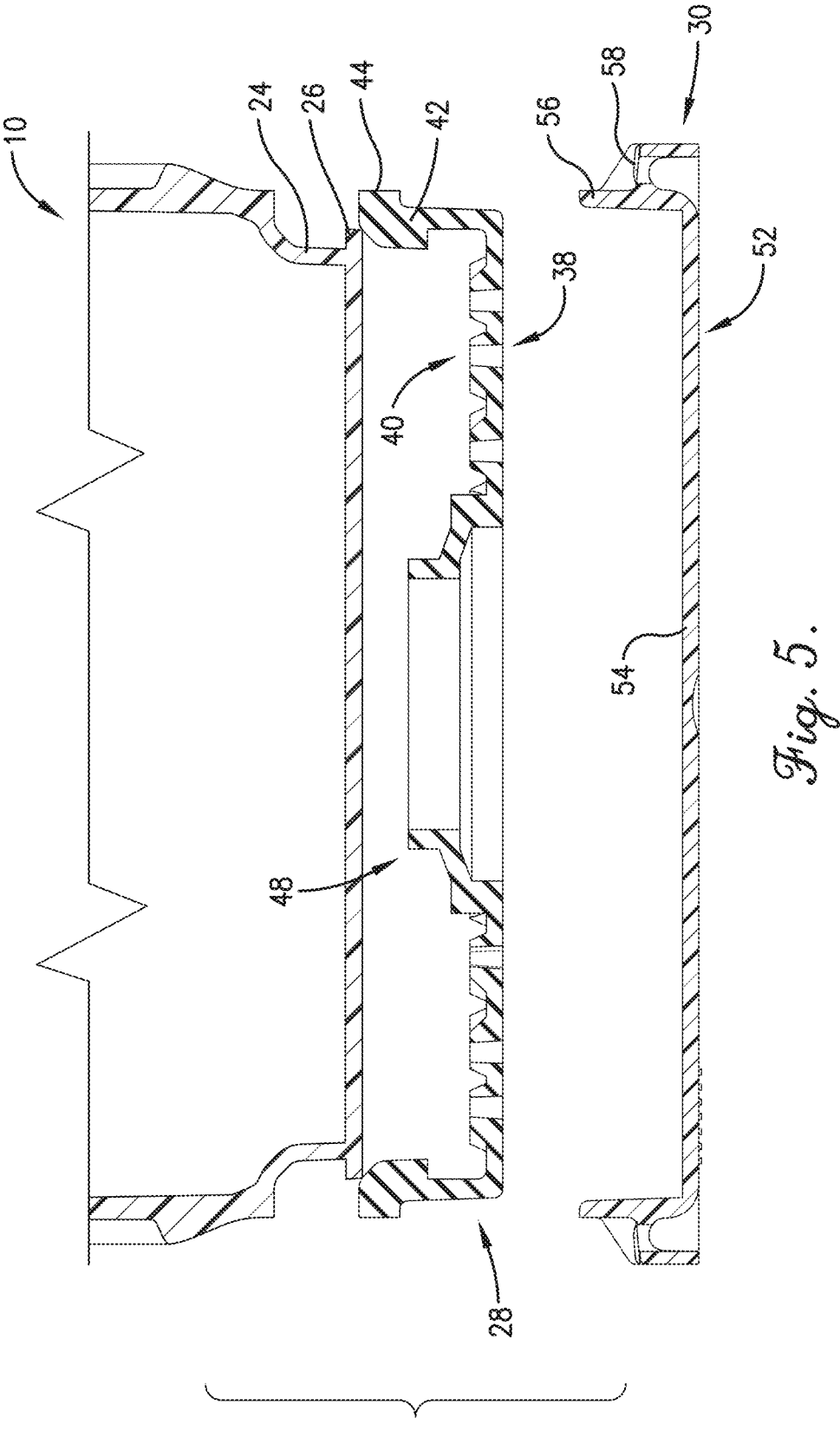
FIG. 5 is a fragmentary sectional view of the shock and vibration absorbing pad, the base plate, and the battery before the pad is placed on the battery and before the pad and battery are placed on the base plate.

As best shown in FIGS. 4 & 5, Duodes 48 constructed in accordance with embodiments of the present invention each comprises an outer ring 80, a relatively smaller diameter inner ring 82 that extends above the outer ring, and a web 84 joining the inner ring to the outer ring. In one embodiment, the Duodes are integrally formed with the upper surface of the pad. In other embodiments, the Duodes may be separately formed and placed on top of the pad. The Duodes may be made of the same materials as the pad or different materials.

The Duodes 48 are compressible in a direction normal to the upper surface of the pad and shift between unloaded, uncompressed states, in which no weight or virtually little weight is applied to them, and loaded, compressed states, in which they are subject to the weight of the battery and other forces associated with vibrations and shocks experienced by the vehicle. One of the Duodes is shown in its unloaded state in FIG. 6 and a partially compressed state in FIG. 7

The quantity, size, and shape of the Duodes can be selected or "tuned" so that the shock and vibration barrier achieves a selected natural frequency for different sizes, shapes, and weights of batteries. In the illustrated embodiment, the pad includes 5 Duodes, one near each corner of the pad and one near the center of the pad, but it may comprise more or fewer Duodes to accommodate various sized batteries.

In one embodiment, the outer ring of each Duode 48 has a diameter of 1-2" and a height of ¼-¾"; and the inner ring has a diameter of 0.5-1" and a height of ¼-¾". The bottom of the inner ring is spaced ¼-¾" above the upper surface of the pad. The wall thickness of the outer ring, inner ring, and web is 1/16-¼". Applicant has discovered that Duodes formed within these dimensions and similar dimensions provides the desired 10 Hz or below natural frequency for most standard sized vehicle batteries.

The shock-mitigating elements 50 will now be described with reference to FIG. 4. The shock-mitigating elements also extend upwardly from the upper surface of the pad and serve to attenuate severe vehicle shocks. The shock-mitigating elements are compressible in a direction normal to the upper surface of the pad and shift between unloaded, uncompressed states, in which no weight or virtually little weight is applied to them, and loaded, compressed states, in which they are subjected to the weight of the battery and other forces associated with vibrations and shocks experienced by the vehicle. As explained below, the shock-mitigating elements only support the battery when the Duodes are compressed to the same height of the shock-mitigating elements by severe vehicle shocks.

The quantity, size, and shape of the shock-mitigating elements can be selected or "tuned" to achieve any degree of shock protection for different sizes, shapes, and weights of batteries. In one embodiment, the pad comprises 20-100 evenly spaced shock-mitigating elements, each in the shape of the truncated pyramid, ⅛-½" tall, and ¼-½" in diameter. In some embodiments, the pad may have shock-mitigating elements of more than one height.

Functions of the Duodes 48 and shock-mitigating elements 50 will now be described primarily with reference to FIGS. 7-9. When the vehicle in which the battery and integrated shock and vibration barrier is installed is in a static state, such as when the vehicle is not moving or otherwise not subject to significant vibrations or shocks, the weight of the battery rests only on the Duodes, and the Duodes are either not compressed or only slightly compressed as depicted in FIG. 7.

When the vehicle begins to move and is subject to vibrations or shocks that could be transmitted to the battery, the Duodes compress, absorb, and attenuate vibrations and shocks to at least partially isolate the battery from the vibrations and shocks as depicted in FIG. 8. Because the Duodes exhibit quasi-zero stiffness, the shock and vibration barrier achieves a system natural frequency of less than 10 Hz, with some embodiments mitigating more than 30% of vibrations in the 10-55 Hz range and other embodiments mitigating more than 30% of vibrations in the 30-36 Hz range.

In normal operations, the weight of the battery is supported only by the Duodes, with the bottom of the battery spaced above the tops of the shock-mitigating elements. This is beneficial when vibrations and shocks are relatively less severe because the Duodes are specifically designed to achieve a system natural frequency of less than 10 Hz because of their quasi-zero stiffness attributes. Also, having only the Duodes contacting the battery when the vehicle is experiencing static conditions or relatively minor vibrations or shocks reduces the contact area beneath the battery and reduces pathways to the battery that could transfer vibrations to the battery.

Figure 9:
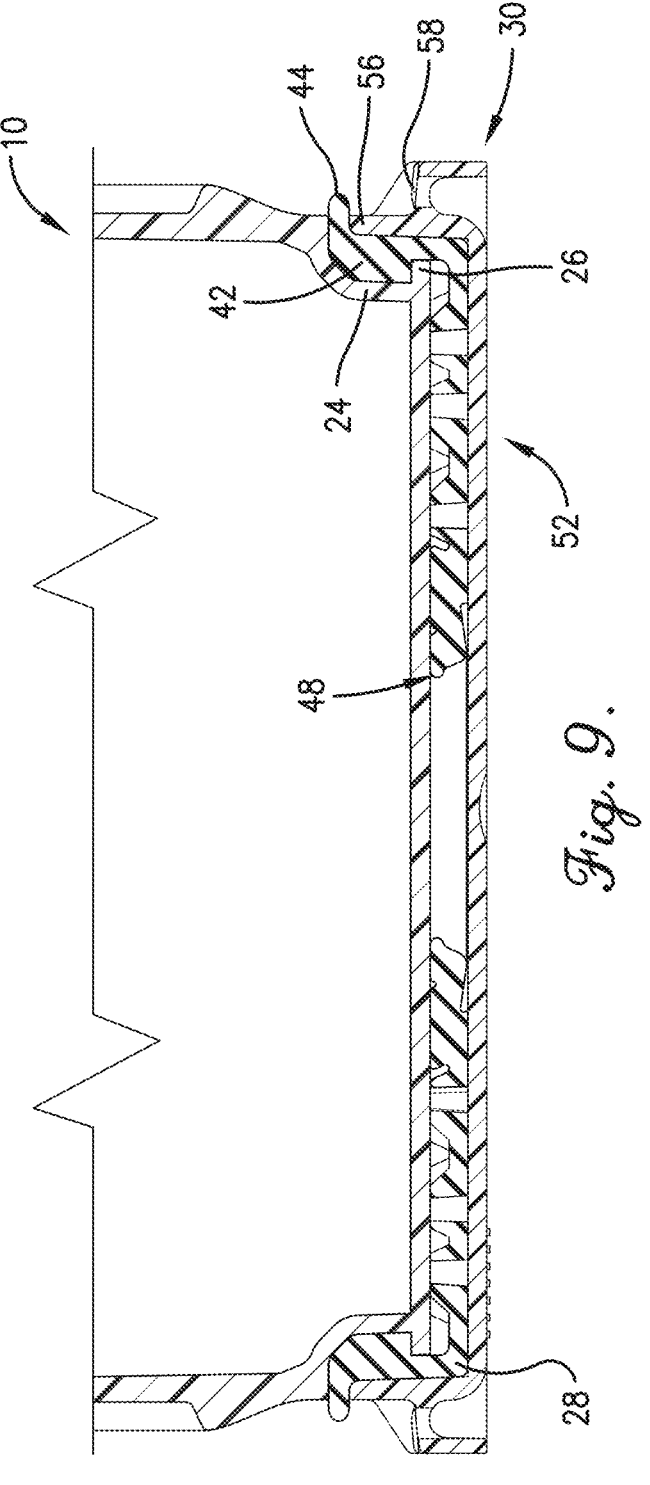
FIG. 9 is a fragmentary sectional view of the pad, the base plate, and the battery when the vehicle in which the battery is installed is transmitting more significant vibrations and/or shocks to the shock and vibration barrier.

When the battery is subject to severe shocks or vibrations, such as when the vehicle drives overs a pothole or other roadway obstructions, the battery compresses the Duodes so that they are approximately as tall as the shock-mitigating elements as shown in FIG. 9. In this state, the battery at least temporarily rests on and is supported by the Duodes and the shock-mitigating elements. Having both the Duodes and the shock-mitigating elements contacting the battery as vibrations or shocks increase in magnitude increases the contact area beneath the battery to provide better protection against significant shocks such as when the vehicle drives over potholes or is otherwise subjected to jarring forces.

The battery and integrated shock and vibration barrier of the present invention offers many advantages over conventional batteries and battery protection devices. The shock and vibration barrier more effectively isolates the battery from shocks and vibrations and achieves a natural frequency of less than 10 Hz, mitigating more than 30% of vibrations in the 10-55 Hz range and the 30-36 Hz range. The shock and vibration barrier also creates no fitment problems and doesn't require volume-reducing modifications to the battery. An OEM vehicle manufacturer or vehicle owner can simply place the battery and shock and vibration barrier in an OEM battery holder and attach the hold down structures in the OEM battery holder to the battery case 10 without any alterations. The securement features interact with the existing hold down structures in OEM battery holders. The shock and vibration features of the invention are prominently revealed by the visible lip of the pad to provide a visual indication of the shock and vibration features of the battery, thus providing a valuable incentive to buy and install the battery and integrated shock and vibration barrier.

Additional Considerations

The detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The detailed description is, therefore, not to be taken in a limiting sense. The scope of the current invention is defined only by the appended claims, along with the full scope of equivalents to which such claims are entitled.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112 (f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A shock and vibration absorbing pad for supporting a battery in a vehicle and minimizing transfer of vibrations and shocks from the vehicle to the battery, the shock and vibration absorbing pad comprising:

a substantially planar bottom surface;

an upper surface opposite the bottom surface;

a plurality of compressible vibration isolators extending upwardly from the upper surface for supporting the battery and mitigating vibrations and shocks, the vibration isolators exhibiting quasi-zero stiffness and configured to mitigate vibrations in the 10-55 Hz range with an isolation efficiency of 30% or more; and a plurality of shock-mitigating elements extending upwardly from the upper surface for mitigating shocks.

2. The shock and vibration absorbing pad of claim 1, wherein the shock and vibration absorbing pad is formed of compressible materials selected from the group consisting of polyurethane, rubber, thermoplastic polyurethane, and elastomeric material.

3. The shock and vibration absorbing pad of claim 1, wherein the shock And vibration absorbing pad is formed of materials with a durometer of greater than 20 Shore A Hardness.

4. The shock and vibration absorbing pad of claim 1, wherein the battery rests on and is supported by only the vibration isolators when the vehicle is not subject to severe vibrations or shocks and wherein the battery rests on and is supported by both the vibration isolators and the shock-mitigating elements when the vehicle is subject to severe vibrations or shocks.

5. The shock and vibration absorbing pad of claim 1, wherein the vibration isolators are configured to mitigate vibrations in the 30-36 Hz range with an isolation efficiency of 30% or more.

6. The shock and vibration absorbing pad of claim 1, wherein the shock and vibration absorbing pad and battery form a system exhibiting a natural frequency of less than 10 Hz.

7. A shock and vibration absorbing pad for supporting a battery in a vehicle and minimizing transfer of vibrations and shocks from the vehicle to the battery, the shock and vibration absorbing pad comprising:

a substantially planar bottom surface;

an upper surface opposite the bottom surface;

a plurality of compressible vibration isolators extending upwardly from the upper surface for supporting the battery and mitigating vibrations and shocks, the vibration isolators exhibiting quasi-zero stiffness and configured to mitigate vibrations in the 10-55 Hz range with an isolation efficiency of 30% or more, wherein each of the vibration isolators comprises an outer ring, a relatively smaller diameter inner ring that extends above the outer ring, and a web joining the inner ring to the outer ring.

8. A shock and vibration absorbing pad for supporting a battery in a vehicle and minimizing transfer of vibrations and shocks from the vehicle to the battery, the shock and vibration absorbing pad comprising:

a substantially planar bottom surface;

an upper surface opposite the bottom surface;

a plurality of compressible vibration isolators extending upwardly from the upper surface for supporting the battery and mitigating vibrations and shocks, the vibration isolators exhibiting quasi-zero stiffness such that the shock and vibration absorbing pad exhibits a natural frequency of less than 10 Hz when mitigating vibrations to the battery; and a plurality of shock-mitigating elements extending upwardly from the upper surface for mitigating shocks.

9. The shock and vibration absorbing pad of claim 8, wherein the shock and vibration absorbing pad mitigates vibrations in the 10-55 Hz range with an isolation efficiency of 30% or more.

10. The shock and vibration absorbing pad of claim 8, wherein the shock and vibration absorbing pad mitigates vibrations in the 30-36 Hz range with an isolation efficiency of 30% or more.

11. The shock and vibration absorbing pad of claim 8, wherein the shock and vibration absorbing pad is formed of a compressible material with a durometer of greater than 20 Shore A Hardness that is selected from the group consisting of polyurethane, rubber, thermoplastic polyurethane, and elastomeric material and wherein the shock and vibration absorbing pad is formed via a process selected from the group consisting of injection molding, casting, machining, stamping, additive manufacturing, and subtractive manufacturing.

12. The shock and vibration absorbing pad of claim 8, wherein the battery rests on and is supported by only the vibration isolators when the vehicle is not subject to severe vibrations or shocks and rests on and is supported by both the vibration isolators and the shock-mitigating elements when the vehicle is subject to severe vibrations or shocks.

13. A shock and vibration absorbing pad for supporting a battery in a vehicle and minimizing transfer of vibrations and shocks from the vehicle to the battery, the shock and vibration absorbing pad comprising:

a substantially planar bottom surface;

an upper surface opposite the bottom surface;

a plurality of compressible vibration isolators extending upwardly from the upper surface for supporting the battery and mitigating vibrations and shocks, the vibration isolators exhibiting quasi-zero stiffness such that the shock and vibration absorbing pad exhibits a natural frequency of less than 10 Hz when mitigating vibrations to the battery, wherein each of the vibration isolators comprises an outer ring, a relatively smaller diameter inner ring that extends above the outer ring, and a web joining the inner ring to the outer ring.

14. A monolithic shock and/or vibration mitigating element for mitigating transfer of vibrations and/or shocks to at least one object having a weight of a battery, the monolithic shock and/or vibration mitigating element comprising:

a substantially planar surface;

a surface opposite the substantially planar surface;

at least one isolator extending outwardly from the surface opposite the substantially planar surface for mitigating vibrations and/or shocks;

wherein the monolithic shock and/or vibration mitigating element exhibits a natural frequency of 100 Hz or less when mitigating vibrations to the object; and wherein the monolithic shock and/or vibration mitigating element further comprises at least one shock-mitigating isolator and at least one vibration-mitigating isolator.

15. The monolithic shock and/or vibration mitigating element of claim 14, wherein the monolithic shock and/or vibration mitigating element is formed of a compressible material.

16. The monolithic shock and/or vibration mitigating element of claim 15, wherein the monolithic shock and/or vibration mitigating element is formed of a compressible material that is selected from the group consisting of polyurethane, rubber, thermoplastic polyurethane, and elastomeric material.

17. The monolithic shock and/or vibration mitigating element of claim 14, wherein the monolithic shock and/or vibration mitigating element is formed of material with a durometer greater than 20 Shore A Hardness.

18. The monolithic shock and/or vibration mitigating element of claim 14, wherein the monolithic shock and/or vibration mitigating element is formed via a manufacturing process selected from the group of molding, casting, stamping, additive manufacturing, or subtractive manufacturing.

19. The monolithic shock and/or vibration mitigating element of claim 14, wherein the object is supported by only the vibration-mitigating isolators when the system is not subject to vibrations and/or shocks.

20. The monolithic shock and/or vibration mitigating element of claim 14, wherein the object is supported by both the vibration-mitigating isolators and the shock-mitigating isolators when the system is subject to severe vibrations and/or shocks.

21. The monolithic shock and/or vibration mitigating element of claim 14, wherein the monolithic shock and/or vibration mitigating element and the object form a system exhibiting a natural frequency of 55 Hz or less.

22. The monolithic shock and/or vibration mitigating element of claim 14, wherein the monolithic shock and/or vibration mitigating element and the object form a system exhibiting a natural frequency of 10 Hz or less.

23. The monolithic shock and/or vibration mitigating element of claim 14, wherein the isolators exhibit a quasi-zero stiffness/negative stiffness response when the weight of the object is applied to the isolators.

24. The monolithic shock and/or vibration mitigating element of claim 14, wherein the isolators comprise at least one conical disc shape.

25. The monolithic shock and/or vibration mitigating element of claim 14, wherein the isolators extend outwardly from the surface opposite the substantially planar surface more than 0.09375 inches and less than 12.0 inches.

26. A monolithic shock and/or vibration mitigating element for mitigating transfer of vibrations and/or shocks to at least one object having a weight of a battery, the monolithic shock and/or vibration mitigating element comprising:
  a substantially planar surface;
  a surface opposite the substantially planar surface;
  at least one isolator extending outwardly from the surface opposite the substantially planar surface for mitigating vibrations and/or shocks;
  wherein the monolithic shock and/or vibration mitigating element exhibits a natural frequency of 100 Hz or less when mitigating vibrations to the object;
  wherein the vibration isolator comprises an outer ring, a relatively smaller diameter inner ring that extends above the outer ring, and a web joining the inner ring to the outer ring.

27. A monolithic shock and/or vibration mitigating element for mitigating transfer of vibrations and/or shocks to at least one object having a weight of a battery, the monolithic shock and/or vibration mitigating element comprising:
  a substantially planar surface;
  a surface opposite the substantially planar surface;
  at least one isolator extending outwardly from the surface opposite the substantially planar surface for mitigating vibrations and/or shocks, the isolators configured to mitigate vibrations in the 10-55 Hz range with an isolation efficiency of 10% or more and;
  wherein the monolithic shock and/or vibration mitigating element further comprises at least one shock-mitigating isolator and at least one vibration-mitigating isolator.

28. The monolithic shock and/or vibration mitigating element of claim 27, wherein the monolithic shock and/or vibration mitigating element is formed of a compressible material.

29. The monolithic shock and/or vibration mitigating element of claim 28, wherein the monolithic shock and/or vibration mitigating element is formed of a compressible material that is selected from the group consisting of polyurethane, rubber, thermoplastic polyurethane, and elastomeric material.

30. The monolithic shock and/or vibration mitigating element of claim 27, wherein the monolithic shock and/or vibration mitigating element is formed of material with a durometer greater than 20 Shore A Hardness.

31. The monolithic shock and/or vibration mitigating element of claim 27, wherein the monolithic shock and/or vibration mitigating element is formed via a manufacturing process selected from the group of molding, casting, stamping, additive manufacturing, or subtractive manufacturing.

32. The monolithic shock and/or vibration mitigating element of claim 27, wherein the object is supported by only the vibration-mitigating isolators when the system is not subject to vibrations and/or shocks.

33. The monolithic shock and/or vibration mitigating element of claim 27, wherein the object is supported by both the vibration-mitigating isolators and the shock-mitigating isolators when the system is subject to severe vibrations and/or shocks.

34. The monolithic shock and/or vibration mitigating element of claim 27, wherein the isolators mitigate vibrations in the 10-55 Hz range with an isolation efficiency of 30% or more.

35. The monolithic shock and/or vibration mitigating element of claim 27, wherein the isolators mitigate vibrations in the 30-36 Hz range with an isolation efficiency of 10% or more.

36. The monolithic shock and/or vibration mitigating element of claim 27, wherein the isolators exhibit a quasi-zero stiffness/negative stiffness response when the weight of the object is applied to the isolators.

37. The monolithic shock and/or vibration mitigating element of claim 27, wherein the isolators comprise at least one conical disc shape.

38. The monolithic shock and/or vibration mitigating element of claim 27, wherein the isolators extend outwardly from the surface opposite the substantially planar surface more than 0.09375 inches and less than 12.0 inches.

39. A monolithic shock and/or vibration mitigating element for mitigating transfer of vibrations and/or shocks to at least one object having a weight of a battery, the monolithic shock and/or vibration mitigating element comprising:
  a substantially planar surface;
  a surface opposite the substantially planar surface;
  at least one isolator extending outwardly from the surface opposite the substantially planar surface for mitigating vibrations and/or shocks, the isolators configured to mitigate vibrations in the 10-55 Hz range with an isolation efficiency of 10% or more;
  wherein the vibration isolator comprises an outer ring, a relatively smaller diameter inner ring that extends above the outer ring, and a web joining the inner ring to the outer ring.

40. A shock and/or vibration mitigating pad for mitigating transfer of vibrations and/or shocks to at least one object having a weight of a battery, the shock and/or vibration mitigating pad comprising:
  a substantially planar surface;
  a surface opposite the substantially planar surface;
  at least one isolator extending outwardly from the surface opposite the substantially planar surface for mitigating vibrations and/or shocks;
  wherein the shock and/or vibration mitigating pad exhibits a natural frequency of 100 Hz or less when mitigating vibrations to the object; and
  wherein the shock and/or vibration mitigating pad further comprises at least one shock-mitigating isolator and at least one vibration-mitigating isolator.

41. The shock and/or vibration mitigating pad of claim 40, wherein the shock and/or vibration mitigating pad is formed of a compressible material.

42. The shock and/or vibration mitigating pad of claim 41, wherein the shock and/or vibration mitigating pad is formed of a compressible material that is selected from the group consisting of polyurethane, rubber, thermoplastic polyurethane, and elastomeric material.

43. The shock and/or vibration mitigating pad of claim 40, wherein the shock and/or vibration mitigating pad is formed of material with a durometer greater than 20 Shore A Hardness.

44. The shock and/or vibration mitigating pad of claim 40, wherein the shock and/or vibration mitigating pad is formed via a manufacturing process selected from the group of molding, casting, stamping, additive manufacturing, or subtractive manufacturing.

45. The shock and/or vibration mitigating pad of claim 40, wherein the object is supported by only the vibration-mitigating isolators when the system is not subject to vibrations and/or shocks.

46. The shock and/or vibration mitigating pad of claim 40, wherein the object is supported by both the vibration-mitigating isolators and the shock-mitigating isolators when the system is subject to severe vibrations and/or shocks.

47. The shock and/or vibration mitigating pad of claim 40, wherein the shock and/or vibration mitigating pad and the object form a system exhibiting a natural frequency of 55 Hz or less.

48. The shock and/or vibration mitigating pad of claim 40, wherein the shock and/or vibration mitigating pad and the object form a system exhibiting a natural frequency of 10 Hz or less.

49. The shock and/or vibration mitigating pad of claim 40, wherein the isolator exhibits a quasi-zero stiffness/negative stiffness response when the weight of the object is applied to the isolator.

50. The shock and/or vibration mitigating pad of claim 40, wherein the isolators comprise at least one conical disc shape.

51. The shock and/or vibration mitigating pad of claim 40, wherein the isolator extends outwardly from the surface opposite the substantially planar surface more than 0.09375 inches and less than 12.0 inches.

52. A shock and/or vibration mitigating pad for mitigating transfer of vibrations and/or shocks to at least one object having a weight of a battery, the shock and/or vibration mitigating pad comprising:

a substantially planar surface;

a surface opposite the substantially planar surface;

at least one isolator extending outwardly from the surface opposite the substantially planar surface for mitigating vibrations and/or shocks;

wherein the shock and/or vibration mitigating pad exhibits a natural frequency of 100 Hz or less when mitigating vibrations to the object;

wherein the isolator comprises an outer ring, a relatively smaller diameter inner ring that extends above the outer ring, and a web joining the inner ring to the outer ring.

53. A shock and/or vibration mitigating pad for mitigating transfer of vibrations and/or shocks to at least one object having a weight of a battery, the shock and/or vibration mitigating pad comprising:

a substantially planar surface;

a surface opposite the substantially planar surface; and at least one isolator extending outwardly from the surface opposite the substantially planar surface for mitigating vibrations and/or shocks, the isolator configured to mitigate vibrations in the 10-55 Hz range with an isolation efficiency of 10% or more; and wherein the shock and/or vibration mitigating pad further comprises at least one shock-mitigating isolator and at least one vibration-mitigating isolator.

54. The shock and/or vibration mitigating pad of claim 53, wherein the shock and/or vibration mitigating pad is formed of a compressible material.

55. The shock and/or vibration mitigating pad of claim 54, wherein the shock and/or vibration mitigating pad is formed of a compressible material that is selected from the group consisting of polyurethane, rubber, thermoplastic polyurethane, and elastomeric material.

56. The shock and/or vibration mitigating pad of claim 53, wherein the shock and/or vibration mitigating pad is formed of material with a durometer greater than 20 Shore A Hardness.

57. The shock and/or vibration mitigating pad of claim 53, wherein the shock and/or vibration mitigating pad is formed via a manufacturing process selected from the group of molding, casting, stamping, additive manufacturing, or subtractive manufacturing.

58. The shock and/or vibration mitigating pad of claim 53, wherein the object is supported by only the vibration-mitigating isolators when the system is not subject to vibrations and/or shocks.

59. The shock and/or vibration mitigating pad of claim 53, wherein the object is supported by both the vibration-mitigating isolators and the shock-mitigating isolators when the system is subject to severe vibrations and/or shocks.

60. The shock and/or vibration mitigating pad of claim 53, wherein the isolator mitigates vibrations in the 10-55 Hz range with an isolation efficiency of 30% or more.

61. The shock and/or vibration mitigating pad of claim 53, wherein the isolator mitigates vibrations in the 30-36 Hz range with an isolation efficiency of 10% or more.

62. The shock and/or vibration mitigating pad of claim 53, wherein the isolator exhibits a quasi-zero stiffness/negative stiffness response when the weight of the object is applied to the isolator.

63. The shock and/or vibration mitigating pad of claim 53, wherein the isolators comprise at least one conical disc shape.

64. The shock and/or vibration mitigating pad of claim 53, wherein the isolator extends outwardly from the surface opposite the substantially planar surface more.

65. A shock and/or vibration mitigating pad for mitigating transfer of vibrations and/or shocks to at least one object having a weight of a battery, the shock and/or vibration mitigating pad comprising:

a substantially planar surface;

a surface opposite the substantially planar surface; and at least one isolator extending outwardly from the surface opposite the substantially planar surface for mitigating vibrations and/or shocks, the isolator configured to mitigate vibrations in the 10-55 Hz range with an isolation efficiency of 10% or more;

wherein the isolator comprises an outer ring, a relatively smaller diameter inner ring that extends above the outer ring, and a web joining the inner ring to the outer ring.

* * * * *